Feb. 2, 1960 K. GEDULDIG 2,923,763

PRINTING TELEGRAPH SYSTEM

Filed Nov. 16, 1956 2 Sheets-Sheet 1

INVENTOR

Karl Geduldig by Erwin Salzer atty.

PRINTING TELEGRAPH SYSTEM

Filed Nov. 16, 1956 2 Sheets-Sheet 2

INVENTOR

Karl Geduldig by Erwin Salzer atty

United States Patent Office 2,923,763

Patented Feb. 2, 1960

2,923,763

PRINTING TELEGRAPH SYSTEM

Karl Geduldig, Darmstadt-Eberstadt, Germany, assignor to Telefonbau und Normalzeit G.m.b.H., Frankfurt am Main, Germany, a firm of Germany Application November 16, 1956, Serial No. 622,678

Claims priority, application Germany November 18, 1955

11 Claims. (Cl. 178—2)

This invention relates to printing telegraph systems, and more specifically to printing telegraph automatic switching systems. Such systems comprise calling subscriber stations originating messages, and called subscriber stations for which the messages are destined, and such systems further comprise switching centers equipped for automatically directing as well as transmitting messages between subscriber stations. The invention refers more particularly to teleprinter or printing telegraph systems wherein each subscriber station, i.e. the subscriber's equipment thereof, is connected to the switching center by a two way transmission path, or a transmission channel or cable comprising two conductors.

It is one object of this invention to provide telecommunication systems of the aforementioned character comprising improved and simplified switching centers as well as improved and simplified subscriber's equipment cooperatively related to the switching center.

As mentioned above, the invention has particular reference to printing telegraph systems wherein each subscriber station is connected to the switching center by a two way transmission path such as a cable having two conductors. According to this invention one of these two conductors and ground are applied for transmitting the transmission initiation or transmission starting impulses, the selecting impulses, the message-text impulses, and the end-of-message impulses, while the other of these two conductors and ground are applied for transmitting signals from the switching center to the various subscriber stations which signals are received at each subscriber station by a receiving relay connected between said other of these two conductors and ground.

This basic arrangement of parts, and more particularly this mode of utilizing each two way communication channel between switching center and subscriber's equipment makes it possible to eliminate, or dispense with, a number of parts such as, for instance, polarized relays, heretofore required in automatic switching centers of the kind under consideration.

Another object of the invention is to provide printing telegraph automatic switching systems which are both simple and flexible, and which apply themselves selectively to simplex operation, duplex operation and mixed operation.

Systems embodying this invention make it possible, when duplex operation is intended, to insert the receiving magnets of the teletypewriters of subscriber stations into the second communication paths used by the switching center for the transmission of signals. To achieve this end the motor control relay at each switching station, i.e. a relay controlled by said second communication paths and adapted to switch the printing telegraph motors on and off, is provided with time-delay means which preclude it being released as a result of the interruption of current flow inherent in the transmission of message-text impulses.

The novel features that are characteristic of the invention are set forth in particular in the appended claims.

The invention itself, however, both as to structure and operation together with additional objects and advantages thereof will best be understood from the following detailed description of a preferred embodiment thereof when read in connection with the accompanying drawings in which, Fig. 1 is a circuit diagram illustrating the local circuits of a subscriber station, i.e. the subscriber's equipment, provided with means for switching selectively from simplex operation to duplex operation, and vice versa;

Figures 1, 2, 3:
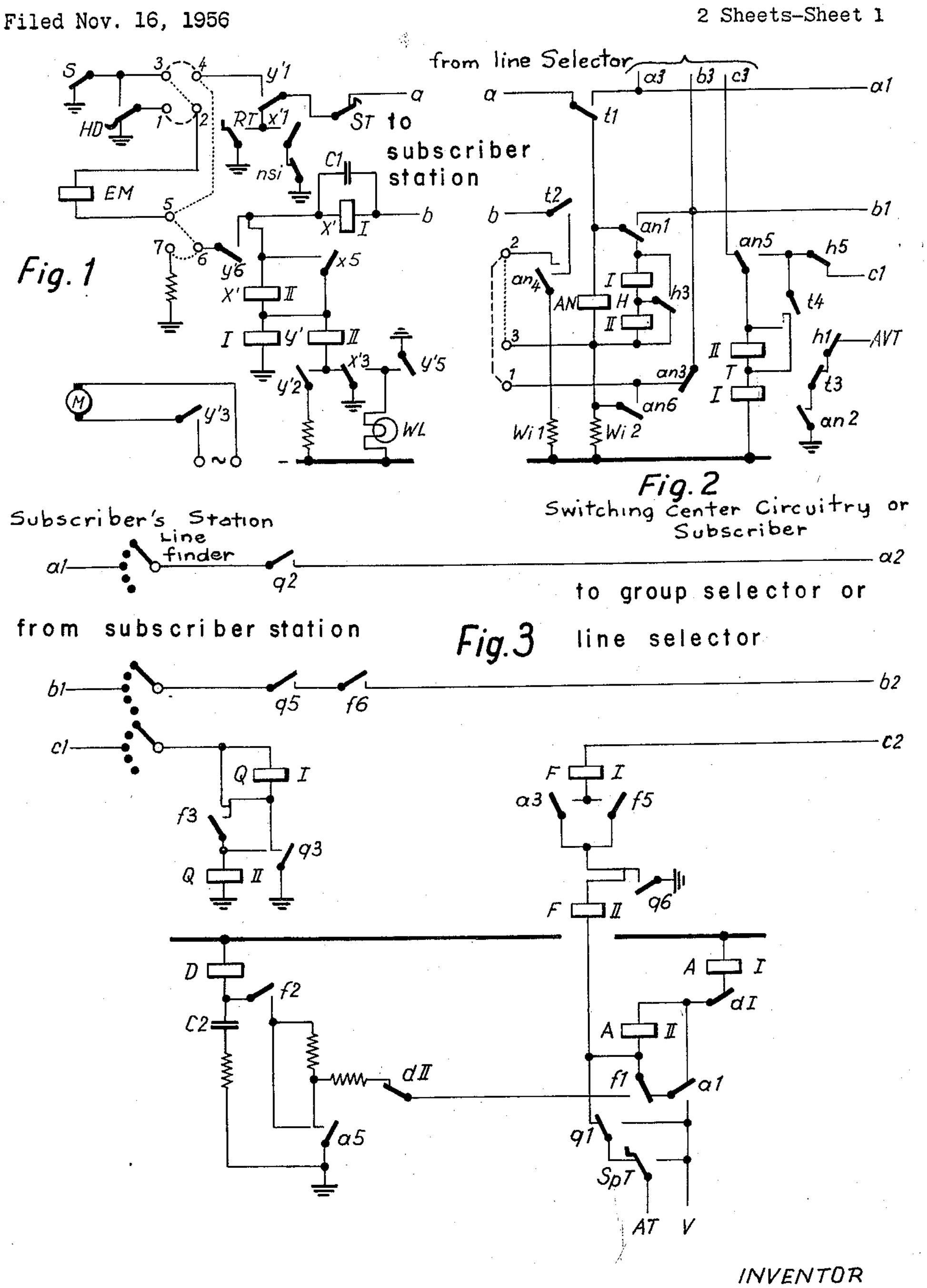
Fig. 2 is a circuit diagram illustrating the circuits at a switching center adapted for simplex operation and for duplex operation of a subscriber station.
Fig. 3 is a circuit diagram of the selecting means of the switching center.

Referring now to the drawings, and more particularly to Fig. 1 thereof, reference character EM has been applied to indicate a receiving magnet, and reference character S has been applied to indicate transmitting contacts, i.e. contacts for transmitting the printing telegraph code impulses corresponding to each letter or figure to be transmitted. Reference letter M indicates an electric motor for operating a typewriter of a printing telegraph. This invention not being concerned with printing telegraphs as such, no such apparatus has been illustrated in the drawings. Various systems of printing telegraphs may be used in connection with the communication system here disclosed. The printing telegraph is associated with a calling switch or key RT, an end-of-message switch or key ST, and a selector dial of which only the impulse contact *nsi* has been shown in Fig. 1. The change-over-switch or key HD enables to change over from duplex operation to half-duplex operation, in which case, with the duplex circuitry established the transmitted messages of subscribers are received and recorded by the recording apparatus, or printer, of the same subscribers. The switching center comprises further a calling lamp WL and two relays X'Y controlled by switching means to be described below by the intermediary of line *b*.

The terminal connections 1—2, 2—3, 3—4, 4—5, 5—6 and 6—7 enable to change selectively from simplex operation to duplex operation.

The operation of the circuitry of Fig. 1 is as follows:

*Outgoing message simplex operation*

Terminals 2 and 3, terminals 4 and 5 and terminals 6 and 7 are conductively interconnected. At rest there is no current flow in either of both conductors *a* and *b*. Upon actuation of calling switch or key RT, conductor *a* is grounded by the intermediary of contact *y'*1 and switch or key ST. This causes initiation of a finder switch or call finder in the switching center which switch connects the respective subscriber station to a first or group selector, or with a line selector, as will be shown below in detail. Following the above operations a voltage is impressed upon conductor *b* by the intermediary of a resistor having a high ohmic value. This causes relay X' with its two windings I and II at the subscriber's end of the line to become operative. Relay Y' arranged in that circuit is also energized, but not sufficiently energized to make it operate. Contact *x'*1 connects impulse contact *nsi* to the outgoing conductor *a*, whereas contact *x'*5 short-circuits winding II of relay X'. Lamp WL is being switched on by contact *x'*3 which disconnects simultaneously winding II of relay Y' from ground. If calling key RT is then being released, and the subscriber begins to dial conductor *a* will be interrupted in the rhythm of the sequence of current impulses produced by contact *nsi*, and the group selectors and line selectors at the switching center will be operated accordingly. If the called line should be busy, conductor *b* is being opened at the switching center as set forth below in detail, and as a result relay X' is de-energized, and lamp WL switched off.

If the called line is idle a voltage is directly impressed at the switching center upon conductor *b*. This causes energization of relay Y' in addition to that of relay X'. Relay Y' is then sealed in its local circuit comprising winding I and II and contact *y*'2. Contact *y*'6 disconnects winding II of relay X' from conductor *b*, relay X' remaining operative since its winding I remains energized, this winding being connected to conductor *b* and its circuit being closed by contact *y*'6 and the connection between terminals 6 and 7. Contact *y*'1 disconnects calling key RT and impulse contact nsi of the dial switch from conductor a and connects the receiving magnet EM and the transmitting contact S to conductor *b*. Contact *y*'3 closes the circuit of electric motor M, thus causing the teletypewriter, or printer, to operate. The receiving magnet EM is being energized by the impulses which are being transmitted by transmitting contact S as well as by the incoming impulses on conductor a which may have originated either at the exchange, or at another subscriber; hence the typewriter or printer prints both texts.

*Outgoing message duplex operation*

In this particular case terminals 1 and 2, 3 and 4, and 5 and 6 are, respectively, conductively interconnected. As in the case of simplex operation, operation of calling key RT initiates the operation of a finder switch, or call finder, at the switching center end of the line. Relay X' responds if a connection has been established with an idle selector mechanism, and relay Y' responds, if the called subscriber line is idle. The circuitry for duplex operation differs from the circuitry for simplex operation in that the circuit of winding I of relay X' includes the receiving magnet EM of the teletypewriter or printer. Therefore receiving magnet EM will be controlled by the incoming signals on connector *b*. If transmitting contact S now interrupts conductor *a* in the rhythms of a message to be transmitted, only the receiving magnet of the printer of the party on the other end of the line will respond.

Capacitor $C_1$ shunting winding I of relay X' precludes inductive distortions which the inductance of that winding would cause if that capacitor were not present. Both relays X' and Y' have a predetermined time-delay release. The release delay of relay X' is in the order of 70 milliseconds. The release delay of relay Y' which is short-circuited by contact *x*'3 when relay X' is being released is in the order of 100 milliseconds. Since the interruptions occurring in transmission of signals are not longer than 120 milliseconds, only relay X' may be caused to release its armature temporarily, yet the armature of relay Y' will never be released. Relay X' is being energized by the next signal impulse which lasts at least 20 milliseconds. It thus appears that relay Y' is not being released as long as message signals are being transmitted.

If it is intended to record at a subscriber's station transmitted intelligence transmitted to another subscriber's station, switch HD is changed over to establish so-called half-duplex operation. During half-duplex operation the transmitting contact S is connected to conductor *a*, exactly as it is during plain duplex operation. The receiving electromagnet EM and the transmitting contact S are connected to conductor *b*, so that the receiving magnet records the own signs of the respective party in addition to those received from somewhere else.

*Incoming messages*

If one party is being called by another by the intermediary of the switching center, line or conductor *b* directly grounded in the process of testing of the line selector. As a result, relays X' and Y' are being energized at once. All other operations are effected in the same way as described above in connection with outgoing messages during simplex operation and duplex operation.

The circuitry shown in Fig. 2 comprises the terminals 1, 2 and 3. For simplex operation terminals 2 and 3, and for duplex operation terminals 1 and 2, are being conductively interconnected.

On occurrence of a call from a subscriber operation of a finder switch or call finder is to be initiated, the system is to be arrested when the called line is connected to the calling line, and another line selector is to be precluded from connecting another calling line to the called line, the signal-transmitting cable conductors must properly be switched, and various signals, depending upon the condition of the line, must be given to the calling party. Relays AN, H and T are provided to achieve these ends. The way in which the circuitry of Fig. 2 works in case of simplex operation, and in case of duplex operation, is as follows:

*Simplex operation*

If a subscriber calls he grounds the conductor *a* as set forth above in connection with the description of the subscriber's equipment. This causes relay H to be operated by its winding I, whereas relay AN connected in parallel to the former is energized by a current sufficient to exert a pull upon its armature, yet not sufficient to operate its contacts. Contact *h*3 connects the high resistance winding II for the low resistance winding I of relay H to conductor *a*. As a result, relay AN is caused to operate. Winding I of relay H being short-circuited, this tends to impart to relay H a release delay. Change over of contact *an*1 causes de-energization of relay H and ground potential is applied to a call distributor AVT (not shown in the drawing) by way of contacts *an*2, *t*3 and *h*1. The testing potential is applied to conductor *c*1 by the intermediary of contacts *an*5 and *h*5, whereas the current path through conductor *c*3 to the line selector is interrupted in order to preclude another calling party from being connected to the calling line. The time delay of relay AN causes a delay in the operation of the finder switch or call finder in the order of 200 milliseconds. This time delay precludes improper starting of the call finder when, during the release to be described below, relays H and AN are at ground potential for the duration of about 150 milliseconds.

When the call finder having been rendered operative by the call distributor AVT tests the respective subscriber line, relay T is energized by its winding I. Operation of contact *t*4 causes a blocking bias or blocking potential to be applied to condictor C1, thus precluding any other call finder from testing. Contact *t*1 disconnects conductor *a* from relay AN and connects said conductor with conductor *a*1 and the call finder. Relay AN being connected to conductor *b*1 remains energized, ground potential being applied by the call finder to that conductor. In addition contact *t*2 impresses a potential across resistor W*i*1 upon conductor *b* connected to the subscriber. This causes energization of relay X' at the subscriber's station.

If dialling is completed and the called line idle, conductor *b*1 is disconnected from ground by the call finder at the switching center. As a result, relay AN releases and a potential is applied to conductor *b* across resistor W*i*2, whose ohmic value is relatively small. This, in turn, starts the printer motor at the subscriber's station. Conductor *b*1 to the call finder is interrupted by contacts *an*1 and *an*.

If the called line is busy, the call finder interrupts conductors *b*1 and *c*1 sequentially, as described below in detail. This causes release of relays AN and T, and the current flow in conductor *b* ceases, thus establishing a busy signal for the subscriber. Contact *t*1 disconnects conductor *a* to the subscriber station from conductor *a*1 to the call finder and reconnects conductor *a* to relays H and AN. Conductor *a* is grounded at the subscriber's end of the line until the clearing signal or disconnect signal becomes effective, i.e. during a period of about 150 milliseconds. Since relays H and AN have a starting relay time of about 200 milliseconds, the temporary grounding of conductor *a* does not start the call finder.

Relay T is energized whenever the circuitry at the switching center coordinated to a subscriber's station is occupied by a line selector by way of conductor *c*3. Contact *t*2 establishes an operating signal to the subscriber through conductor *b*, whereas contact *t*1 connects conductor *a*3 from the line selector to conductor *a*3 to the subscriber station. Conductor *b*3 from the line selector remains open.

*Duplex operation*

Generally speaking, the steps involved in duplex operation are like those in simplex operation. Duplex operation differs from simplex operation inasmuch as in the former after dialling is completed the called line being idle, as a result of the release of relay AN, incoming conductor *b* from the subscriber station is connected through terminals 2–1 and contact *an*3 to conductor *b*1 to the call finder, and consequently also to the line selector. The grounding of conductor *b* at the station of the subscriber causes switching over for duplex operation at the line selector, while the potential applied to conductor *b* at the line selector establishes an operating signal for the subscriber.

The particular call finder shown in Fig. 3 does not require any switch over for simplex and duplex operation. That call finder may either be connected to a group selector or to a line selector.

If a subscriber calls, the call distributor AVT (not shown in detail) connects terminal AT to ground. As a result, relay A operates, its winding I being energized. Contact *a*3 closes an electric circuit comprising windings I and II of relay F, conductor *c*2 to the group selector or line selector, and the holding relay of such selector. Relay F responds if the selector is idle. If the same is busy, i.e. relay F not energized by conductor *c*2 then the applied potential is transferred by contacts *f*1 and *a*1 to another call finder.

The rotary magnet D of the call finder is energized through contacts *a*5 and *f*2. Upon initial closing of these contacts this selector makes one step, resulting in that the armature contact *d*I again disconnects relay A. This, in turn, deenergizes rotary magnet D by opening of contact *a*5, and the stated sequence of operations then begins again. When the switching center circuitry of the desired subscriber station has been found, relay Q is caused to operate, and the contact *q*1 of the latter then interrupts the circuit of impulse relay A. Testing relay Q comprises two windings I and II one being a high resistance winding and the other a low resistance winding. Closing of contact *q*3 causes testing relay Q to be energized by its low resistance winding, as a result of which a blocking bias or blocking potential is being applied to conductor *c*1 to the switching center circuitry of the subscriber station. Contact *q*6 establishes a path of low resistance between selector conductor *c*2 and ground, causing the holding relay of the selector to respond, relay F remaining energized through conductor *c*2.

Contacts *q*2 and *q*5 connect line conductors *a*1, *b*1 to selector line conductors *a*2, *b*2.

If one of two connected subscribers initiates an interruption of message transmission, or if the called subscriber line is busy, line conductor *c*2 is being opened by the selector associated with the call finder, resulting in release of relay F and interruption of line conductor *b*2 by contact *f*6. Contact *f*3 short-circuits winding I of relay Q which releases its armature upon a predetermined time delay, thereby opening by means of contact *q*3 the line conductor *c*2 to the subscriber's switching center circuitry.

Figure 4:
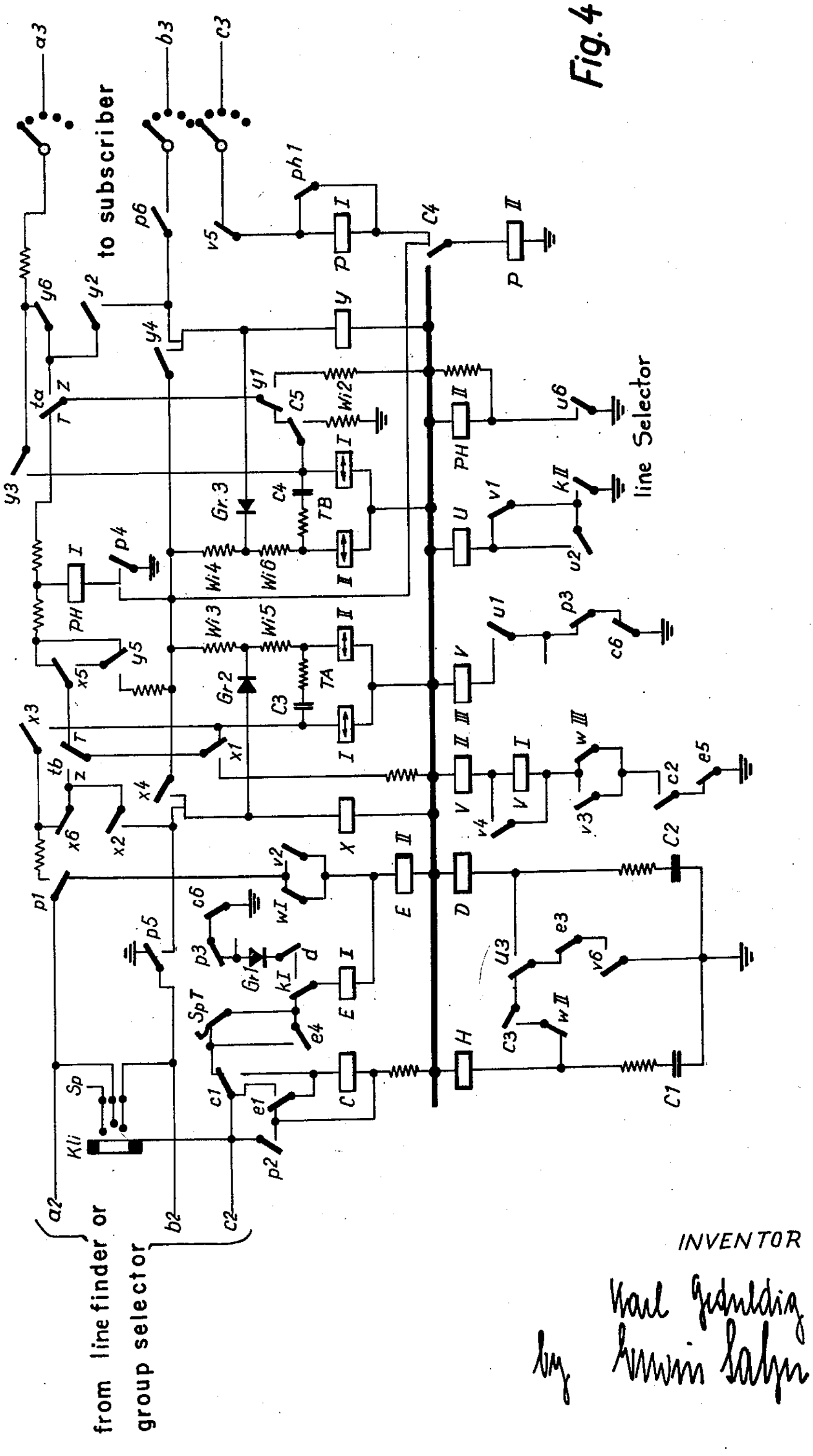
Fig. 4 is a circuit diagram of a line selector adapted for both simplex operation and duplex operation.

The line selector shown in Fig. 4 is adapted for both simplex operation and for duplex operation, the switch from one mode of operation to the other being effected automatically.

The line selector may either be fixedly associated with a call finder (Fig. 3), or may be under the control of a group selector connected between the call finder and the line selector, or connector.

If the line selector, or connector, is fixedly associated with the call finder of Fig. 3 conductor *c*2 is grounded through a high resistance upon initiation of the operation of the line selector. As a result, relay E is energized by its winding I. Contact *e*1 connects relay C to the incoming conductor *c*2. Initially relay C is only energized to the extent that its armature is slightly attracted, yet its contacts not operated. The line selector completes its testing operation and grounds conductor *c*2 through a resistor having a relatively small ohmic value. Relay C is sealed in by contact *c*1 in the sense that its energization does not depend upon the position of contact *e*1. Contact *c*1 disconnects the winding I of relay E from conductor *c*2. The latter relay being connected to conductor *a*2 remains operative, conductor *a*2 being grounded at the subscriber's station. Actuation of contact *c*5 energizes the polarized receiving relay TB through its winding I, causing its armature *tb* to move to signal side *z*. Closing of contact *c*3 prepares the circuit for the lifting magnet H of the line selector or connector. When conductor *a* is being interrupted by operation of the number dial by the subscriber, relay E releases the armature thereof in the rhythm of the impulses set up by the operation of the dial. Contact *e*5 causes energization of relay V through its two windings I and II, resulting in closing of the circuit of lifting magnet H through contacts V6 and *e*3. The selector makes as many steps as the number of impulses which come in through conductor *a*, relay V remaining operative during the time the sequence of impulses occurs its low resistance winding I being short-circuited. Head contacts *k*I and *k*II are changed over at the first lifting step, which makes it possible for the change over relay U to be energized through head contact *k*II and normally closed contact *v*1 upon release of relay V at the end of the first series of impulses. Upon being energized the relay U is being sealed in by its own contact *u*2. The additional contact *u*3 of relay U switches impulse contact *e*3 over to the rotary magnet D of the line selector, or connector, whereas contact *u*6 causes relay PH to become energized through its winding II. At the next series of impulses set up by operation of the dial, relay V is again energized, so that at each impulse of this series of impulses the selector is rotated one step forward. At the first rotary step shaft contacts *w*I, *w*II and *w*III are actuated, as a result of which relay E is being disconnected by contacts *v*2 and *w*I from conductor *a*2 at the end of the second series of impulses when the armature of relay V is being released. This makes it impossible for relay V to be energized by subsequent impulses, the energizing circuit for this relay remaining interrupted at the shaft contact *w*III.

Actuation of contact *e*1 short-circuits relay C, causing release thereof with a time delay of about 150 milliseconds. During that time the line of the called subscriber is being tested as to whether it is idle or busy. Contact *v*5 connects the testing relay P to conductor *c*3. If the called line is busy, relay P remains inoperative. As a result line *c*2 from either the call selector, or from the group selector, is interrupted by contact *c*1 upon release of relay C. This interruption results in release of the connection between the two parties. At the same time contact *c*6 causes energization of relay V through its winding III, so that the rotary magnet D is being reenergized. The rotary magnet D then closes by its armature contact *d* the circuit of the two windings I and II of relay E, and opening of contact *e*3 then causes reopening of the circuit of rotary magnet D. This play between relay E and rotary magnet D is repeated until the line selector is returned to its initial or rest position, in which head contact kI in the circuit of relay E is being turned over.

If the line of the called party is idle, relay P is caused to operate both its windings I and II being energized. Closing of contact p2 then maintains a potential on conductor c2 connected to the call finder, or the group selector. Closing of contact p4 and simultaneous opening of contact c4 establishes a path of low resistance from conductor c3 to ground. This, in turn, results in blocking the called line. The next step is a test to determine whether the calling subscriber and the called subscriber are set up for simplex operation, or for duplex operation.

*Simplex operation*

If both subscribers are connected for simplex operation, lines b are open at the subscribers ends of the lines and therefore contacts p5 and p6 of the line selector connected to line b remain inoperative. Line a establishes the following circuits for the receiving magnets TA and TB:

(a) Ground at the calling subscriber (Fig. 1), transmitting contact S, terminals 3—2, receiving magnet EM, terminals 5—4 contact y'1, end-of-message key ST, line a, contact t1 (Fig. 2), line a1, wiper of call finder (Fig. 3), contact q2, line a2, contact p1 in the line selector (Fig. 4), contact x6, contact tb in the signal position z, contact x1, relay TA winding I.

(b) Ground at the called subscriber, transmitting contact S, terminals 3—2, receiving magnet EM, terminals 5—4, contact y'1, end-of-message key ST, line a, contact t1, line a3, wiper of the line selector (Fig. 4), contact y6, contact ta in signal position z, contact y1, c5, relay TB winding I. In addition thereto the two telegraph relays TA and TB are being energized by windings II establishing the following circuits.

(c) Ground, contact p4, resistors Wi3, Wi5, relay TA winding II and (d) Ground, contact p4, resistors Wi4, Wi6, relay TB winding II.

The current in circuits a and b being larger than the currents in circuits c and d, relays TA and TB are only acted upon by the two circuits c and d if circuits a and b are being interrupted after each signal. The local circuits c and d therefore cause a return of the two armatures ta and tb to the open or disconnecting position t thereof.

When the calling subscriber interrupts circuit a in the rhythm of the printing telegraph coding of his message by means of the transmitting contact or key S of his printing telegraph, contact ta of relay TA is being moved to the open position t thereof, thereby interrupting circuit b. As a result, the impulses are transmitted through line a from the calling subscriber to the called subscriber. The winding I of relay TB remains, however, energized by a circuit comprising contact p4, winding I of relay PH, contact ta, and contacts y1 and c5. This precludes relay TB from actuating its armature when the current in the incoming line a is being interrupted. Relay TB is slightly damped by a capacitor C4 and a resistor arranged in series therewith to bridge the operating time of relay TA. As long as contact ta is in the t or disconnect position thereof, relay PH is being energized by the back ampere turns of its winding I, which results in a release within about 60 milliseconds. Contact ph1 short-circuits winding I of relay P, this relay having a release time of about 100 milliseconds. As mentioned above, the interruptions occurring during teletype transmission have a duration not exceeding 120 milliseconds, and therefore relay PH is being released at times, whereas relay P remains operative. Relay PH is being energized and operated at the next current impulse which lasts at least 20 milliseconds, resulting in full energization of relay P.

When the called subscriber interrupts line a by means of his transmission contact or key S, the interruptions of current flow are being received by relay TB, as described before, and retransmitted by way of line a to the calling subscriber by means of contact tb. A holding circuit is being established for relay TA during interruptions, which circuit includes the back-ampere-turn-producing winding I of relay PH. The holding circuit for relay TA is of the same kind as the holding circuit for relay TB, referred to above.

To finish transmission of intelligence one of the two subscribers interrupts the line a for a relatively long time by depressing the finish or end-of-message key, resulting in release of relay PH and subsequent release of relay P. Contact p2 then interrupts line c to the call finder, or group selector, to which it was connected. The parts are then returned to their original position, as described above in connection with the call finder, and the selector shaft is returned to its idle position in the same way as in the case a called line is busy, which operation has also been described above.

*Duplex operation*

In case of duplex operation, both ends of line b are grounded at the switching center. As a result, relays X and Y of the line selector become operative upon operating contacts p5 and p6. Contacts x4 and y4 disconnect both lines b from relays X and Y, and both relays remain energized by a circuit including contact p4. The other contacts of relays X and Y switch receiving and re-transmitting relays TA and TB in such a way that contacts ta and tb are connected to lines b, whereas winding I of both relays is being connected to lines a. This establishes the following circuits:

(a) Ground at the calling subscriber station (Fig. 1), transmitting contact S, terminals 3—4, contact y'1, finish or end-of-message key ST, line a, contact t1 (Fig. 2), line a1, wiper of call finder (Fig. 3), contact q2, line a2, contact p1 in the line selector (Fig. 4), contact x3, relay TA winding I.

(b) Ground at the calling subscriber station (Fig. 1), switch HB, terminals 1—2, receiving magnet EM, terminals 5—6, contact y'6, relay X' winding I, line b, contact t2 (Fig. 2), contact an4, terminals 2—1, contact an3, line b1, wiper of the call finder (Fig. 3), contacts q2, f6, line b2, contact p5 in the line selector (Fig. 4), contact x2, contact tb in signalling position z, contact x1.

(c) Ground at the called subscriber station, transmitting contact S, terminal 3–4, contact y'1, finish or end-of-message key ST, line a, contact t1, line a3, wiper of the line selector (Fig. 4), contact y3, relay TB winding I.

(d) Ground at the called subscriber station, switch HD, terminals 1—2, receiving magnet EM, terminals 5—6, contact y'6, relay X' winding I, line b, contacts t2 and an4, terminals 2—1, contact an3, line b3, wiper of the line selector (Fig. 4), contacts p6, y2, and ta in signalling position z and contact y1.

When the calling subscriber interrupts circuit a by means of the transmitting contact of his printing telegraph, contact ta of relay TA is being actuated, thereby interrupting line b to the called subscriber. This results in that the receiving magnet of the called subscriber receives the transmitted signals by energization of circuit d. The called subscriber may interrupt at the same time circuit c by means of his transmitting contact, causing energization of the receiving magnet EM at the called subscriber station by circuit b.

Contacts x5 and y5 disconnect back-ampere-turn-producing winding I of relay PH from the circuit including relay TA. Hence relay PH is not being energized any longer when contact tb is switched over to the t or disconnect position thereof. Winding I only then establishes a back flux, or reverse flux, when contact ta is being switched over to the t or disconnect position thereof. This mode of operation of relay PH depending upon the direction of the signals is necessary to prevent relay PH during signalling in both directions to be subjected to a negative magnetomotive force of sufficient duration to cause release of relay P, resulting in unintentional interruption of service.

The different mode in which winding I of relay PH is rendered effective, depending upon the direction of communication, has its counterpart in the way in which release, or end-of-message transmission is effected by the calling subscriber station, and by the called subscriber station, respectively. If the calling subscriber operates his end-of-message key ST, relay TA is caused to move its armature to the disconnect position thereof. This causes interruption of the connection between the parties by release of relays PH and P, as more fully explained in connection with simplex operation. If the called subscriber operates his end-of-message key ST, armature *tb* is moved to the disconnect position *t*, thereby interrupting for some time the line *b* to the calling subscriber. This causes sequential release of relays X′ and Y′ at the end of the line of the calling subscriber. This, in turn, causes interruption of line *a* at the switching center, resulting in operation of the armature of relay TA in the line selector. This initiates termination of the connection between the two parties by relays PH and P.

In the case of simplex operation the receiving magnet EM is connected in series with relay TA and relay TB, respectively. However, in the case of duplex operation circuits *a* and *c* do not comprise the inductivity inherent in the receiving magnet EM. As a result, the armature of relays TA and TB tend to move faster from the disconnect to the signal position thereof. It is, therefore, necessary in order to preclude distortion of the signalling impulses, to cause relays TA and TB to move also faster from the signalling side to the disconnect side thereof, i.e. to increase the energizing current of their windings II. This can be achieved by short-circuiting the resistors W*i*3 and W*i*4 by contact *x*4 and rectifier G*r*2, and contact *y*4 and rectifier G*r*3, respectively, whenever duplex operation is intended.

*Mixed operation*

The line selector shown in Fig. 4 permits to establish a connection between subscriber's equipment connected for simplex operation with a subscriber whose equipment is arranged for duplex operation. In this instance messages can only be transmitted alternately, as in the case of simplex operation.

Assuming the calling subscriber station to be connected for duplex operation and the called subscriber station for simplex operation, under such conditions only relay X of the line selector becomes operative. Hence only winding I of relay TA is being connected to line *a*2 to the calling subscriber and contact *tb* to the line *b*2 to the calling subscriber, whereas winding I of relay TB and contact *ta* remain connected to line *a*3 to the called subscriber. In the reverse situation only relay Y becomes operative, which results in similar switching operations. In both instances winding I of relay PH is also energized by contacts *x*5 and *y*5 in case that contact 1*b* is situated on the disconnect side *t* thereof. Hence interruption of the connection occurs in the same way as in case of simplex operation.

Having fully described my invention and illustrated a preferred embodiment thereof it will be understood that various changes and modifications may be made by those versed in the art without departing from the spirit and scope of my invention; hence I do not intend to be limited by the exemplary preferred embodiment illustrated, but what I claim as new and wish to secure by Letters Patent is:

1. A printing telegraph switching system comprising a plurality of subscriber stations; a switching center for said plurality of stations; a plurality of two wire transmission paths each connecting one of said plurality of stations to said center; each of said plurality of stations comprising an initiating-impulse-transmitting means, a selecting-impulse-transmitting means, an end-of-message-impulse-transmitting means, and a message-intelligence-transmitting means each adapted to be operatively connected to one wire of one of said plurality of transmission paths and to ground; each of said plurality of stations further comprising a signalling-lamp, a lamp-switching-relay for said lamp, a telegraph-operating motor, and a motor-switching-relay for said motor, said lamp-switching-relay and said motor-switching-relay being adapted to be operatively connected to the other wire of one of said plurality of transmission paths and to ground; said center comprising selecting means, means responsive to said initiating-impulse-transmitting means for connecting said selecting means to any of said plurality of stations when calling; means under the control of said connecting means for transmitting a first signal over said other wire of one of said plurality of transmission paths to operate said lamp-switching-relay to switch said lamp in one of said plurality of stations when calling; means for testing any of said plurality of transmission paths; and means under the control of said testing means for transmitting a second signal over said other wire of one of said plurality of transmission paths to operate said motor-switching-relay to switch-on said telegraph-operating-motor in one of said plurality of stations when calling.

2. A printing telegraph switching system as specified in claim 1 wherein each of said plurality of stations is provided with a receiving magnet adapted to receive message-intelligence impulses transmitted by another of said plurality of stations, and wherein each of said plurality of stations is further provided with a switching means adapted to selectively connect said receiving magnet in series with said message-intelligence-transmitting means in a circuit including one wire of one of said plurality of transmission paths and ground, and in a circuit including the other wire of said one of said plurality of transmission paths and ground.

3. A printing telegraph switching system as specified in claim 1 wherein said lamp-switching-relay and said motor-switching-relay are relays differing in regard to the sensitivity thereof.

4. A printing telegraph switching system as specified in claim 1 comprising means for interrupting selectively a plurality of circuits each including said other wire of each of said plurality of transmission paths by operation of said end-of-message impulse transmitting means in each of said plurality of stations.

5. A printing telegraph switching system as specified in claim 1 wherein the switching-center-end of each of said plurality of transmission paths is associated with two relays of which one is adapted to be energized in response to an initiating impulse, and wherein a call finder includes a circuit adapted to maintain said one relay energized during the period of time required for establishing a connection.

6. A printing telegraph switching system as specified in claim 1 wherein said switching center is provided with a line selector for testing said plurality of transmission path, and wherein said line selector is associated with switching means responsive to selection of a busy subscriber station for interrupting the transmission path to a calling subscriber station.

7. A printing telegraph switching system as specified in claim 1 wherein said switching center includes switching center circuitry for each of said plurality of subscriber stations, said switching center circuitry comprising a starting relay adapted to cause an increase of current-intensity in said other wire of one of said plurality of transmission path in response to de-energization of said starting relay; a call finder including a circuit maintaining said starting relay energized during the time required for establishing a connection between a calling subscriber station and a called subscriber station and de-energizing said starting relay upon being interrupted; a line selector; an intermediate circuit between said call finder and said line selector; and switching means associated with said line selector adapted to effect a transient increase of current intensity in said intermediate circuit and a transient interruption of said circuit included in said call finder in response to selecting of an idle transmission path by said line selector to thereby de-energize said starting relay and increase the current intensity in said other wire of said plurality of transmission paths to cause said motor-switching-relay to switch-on said telegraph-operating-motor.

8. A printing telegraph switching system comprising a plurality of subscriber stations; a switching center; a plurality of two-wire transmission paths each connecting one of said plurality of subscriber stations to said switching center; each of said plurality of subscriber stations being provided with initiating-impulse-transmitting means, selecting-impulse-transmitting means, end-of-message-impulse-transmitting means, and message-intelligence-transmitting means, each of said aforementioned means being adapted to be operatively connected to one wire of one of said plurality of two-wire transmission paths and to ground; each of said plurality of subscriber stations being further provided with a signalling-lamp, a lamp-switching relay for said lamp, a telegraph-operating-motor, a motor-switching-relay for said motor, and a receiving magnet, said lamp-switching-relay and said motor-switching-relay and said receiving magnet being adapted to be operatively connected to the other wire of said one of said plurality of two-wire transmission paths and to ground and said motor-switching-relay having such a time lag as to be non-responsive to message-intelligence signals operating said receiving magnet; said center comprising selecting means, means responsive to said initiating-impulse-transmitting means for connecting said selecting means to any of said plurality of stations when calling; means under the control of said connecting means for transmitting a first signal over said other wire of one of said plurality of transmission paths to operate said lamp-switching relay to switch said lamp in one of said plurality of stations when calling; means for testing any of said plurality of transmission paths; and means under the control of said testing means for transmitting a second signal over said other wire of one of said plurality of transmission paths to operate said motor-switching-relay to switch-on said telegraph-operating-motor in one of said plurality of stations when calling.

9. A printing telegraph switching system as specified in claim 8 wherein said motor-switching-relay is adapted to operatively connect said receiving magnet to said other wire of one of said plurality of two-wire transmission paths for the purpose of duplex operation.

10. A printing telegraph switching system as specified in claim 8 wherein said motor-switching-relay is adapted to operatively connect said receiving magnet to said other wire of one of said plurality of two-wire transmission paths for the purpose of duplex operation, and wherein said motor-switching-relay is provided with seal-in-means under the control of said lamp-switching-relay.

11. A printing telegraph switching system as specified in claim 8 wherein said lamp-switching-relay comprises a winding arranged in the current path of said other wire of one of said plurality of two-wire transmission paths and wherein capacitor means shunt said winding to compensate for the distortions of message-intelligence-transmitting signals tending to be caused by the inductance of said winding.

References Cited in the file of this patent

UNITED STATES PATENTS

| | | |
|---|---|---|
| 2,654,797 | Knandel | Oct. 6, 1953 |
| 2,664,459 | Oberman | Dec. 29, 1953 |
| 2,673,234 | Lesigne | Mar. 23, 1954 |
| 2,676,199 | Bacon | Apr. 20, 1954 |
| 2,714,626 | Locke | Aug. 2, 1955 |